United States Patent [19]

Verini

[11] 4,149,694

[45] Apr. 17, 1979

[54] U-SHAPED ANTENNA MOUNTING ASSEMBLY FOR AUTOMOBILES

[76] Inventor: Anthony J. Verini, 30 Cenox Ave., Green Brook, Somerset County, N.J. 08812

[21] Appl. No.: 914,176

[22] Filed: Jun. 9, 1978

[51] Int. Cl.² .............................................. H01G 1/32

[52] U.S. Cl. ................................ 248/539; 248/226.3; 343/715

[58] Field of Search ..................... 248/226.3, 534, 536, 248/538, 539; 343/711, 713, 715

[56] References Cited

U.S. PATENT DOCUMENTS

| | | | |
|---|---|---|---|
| 2,158,005 | 5/1939 | Eisenman | 248/226.3 |
| 2,461,256 | 2/1949 | Black | 248/226.3 |
| 3,636,342 | 1/1972 | Blount | 248/226.3 X |
| 4,028,705 | 6/1977 | Loyd | 343/715 |
| 4,037,229 | 7/1977 | Dunk | 343/715 |
| 4,114,158 | 9/1978 | Verini | 343/715 |
| 4,114,159 | 9/1978 | Verini | 343/715 |

*Primary Examiner*—William H. Schultz
*Attorney, Agent, or Firm*—Frederick W. Padden

[57] ABSTRACT

A CB antenna (10) or the like is mounted on the edge of an automobile trunk lid (12) by means of a stepped bracket (18), which carries the antenna, and a U-shaped support member (20) which is mountable on the trunk lid edge. The support member has a pair of opposing sides (20.2, 20.3) joined by a base (20.1) having a rectangular aperture (20.4) therein. One side (20.3) is depressed to form a plateau (20.5), and a plate (20.6) covers the plateau to form a slot (20.7) into which a lower tread (18.3) of the bracket is inserted. The rectangular aperture is reversed into the base so that a riser (18.4) of the bracket fits into the aperture flush with the base when the lower tread is inserted into the slot. Snap fit means (20.8, 18.5, 18.6) is included on the end portions of the one side (20.3) of the support member to secure the lid therein. A protective coating (20.9) is provided on the inner surface of the other side (20.2) to prevent the outer surface of the lid from being marred.

10 Claims, 7 Drawing Figures

U-SHAPED ANTENNA MOUNTING ASSEMBLY FOR AUTOMOBILES

BACKGROUND OF THE INVENTION

This invention relates to mounting assemblies, and, more particularly, to assemblies for mounting CB antennas and the like on, for example, the trunk lid of an automobile.

Advertising, in myriad forms, has touted the virtues of owning citizen band (CB) transceivers, and millions of Americans have succumbed to the tune of many millions of dollars spent. Indeed, the virtues are real: the proliferation of CB equipment has contributed to convenient and widespread communication for business, recreational and public interest purposes. But, as in a classic tragedy, virtue always seems to be juxtaposed with evil: owners of CB equipment have suffered economic loss in the damage to transceivers, antennas and mounting brackets as well as the vehicle itself due to theft and vandelism.

Because the public display of a CB antenna is known to attract thieves and vandals, numerous mounting assemblies have been proposed in an attempt, on the one hand, to safeguard against undesired detachment of the antenna from the vehicle and, on the other hand, to permit ready detachment for storage of the antenna out of view. To gain acceptance from the public, such mounting assemblies must generally be simple to mount and use, and to obtain similar acceptance from manufacturers should be inexpensive and, hence, simple to fabricate as well as compatible with a wide variety of vehicle types.

SUMMARY OF THE INVENTION

It is, therefore, a broad object of my invention to provide an assembly for detachably mounting an object on a rigid body.

It is a more specific object of my invention to provide an assembly for detachably mounting a CB antenna to, for example, the trunk lid of an automobile.

It is an another object of my invention to provide such an assembly which safeguards against undesired or unauthorized detachment of the antenna and yet permits ready detachment for storage purposes.

It is yet another object of my invention to provide such an assembly which is easy to use and install, and inexpensive to manufacture.

These and other objects are accomplished in accordance with a broad aspect of my invention, an assembly for mounting an object, such as a CB antenna, on a rigid body, such as a trunk lid, comprising a stepped bracket for carrying the object on an upper tread and a support member mountable on an edge of the rigid body and adapted to releaseably engage a lower tread of the bracket, characterized in that the support member forms a U-shaped channel by means of a planar base connected to a pair of opposing planar sides. The base has an aperture therein adapted to receive a riser of the bracket, and one side is depressed to form a plateau in substantial registration with the aperture. A plate covers the plateau to form a slot into which the lower tread snuggly fits when the riser is placed in the aperture of the base. Fastener means holds the edge of the rigid body between the sides of the U-shaped channel.

In a preferred embodiment, the aperture in the base is recessed to the thickness of the base and to the width of the riser so that, when the lower tread is fully inserted into the slot, the riser fits in the aperture flush with the base.

In another embodiment, the inner surface of the other side of the U-shaped channel, which is intended to contact the outer surface of the rigid body (e.g., trunk lid), is provided with a protective coating which prevents the rigid body from being scratched or marred during the mounting, demounting or other movement of the bracket or support member.

In still another embodiment, the fastener means comprises a pair of screws which are threaded through holes in the one (depressed) side of the channel so that the edge of the body is held between the screws and the other side of the channel. To this end, the width of the channel between the sides should be somewhat greater than the thickness of the edge of the body on which it is mounted. In addition, these screws can also be threaded through holes in the cover plate to secure it against the inner surface of the depressed side of the channel.

A feature of another embodiment is the provision of a dimple and mating recess in the cover plate and depressed side in order to effect a snap fit engagement of the lower tread into the slot.

BRIEF DESCRIPTION OF THE DRAWING

My invention, together with its various features and advantages, can be readily understood from the following more detailed descriptions taken in conjunction with the accompanying drawing, in which.

DETAILED DESCRIPTION

Figure 1:
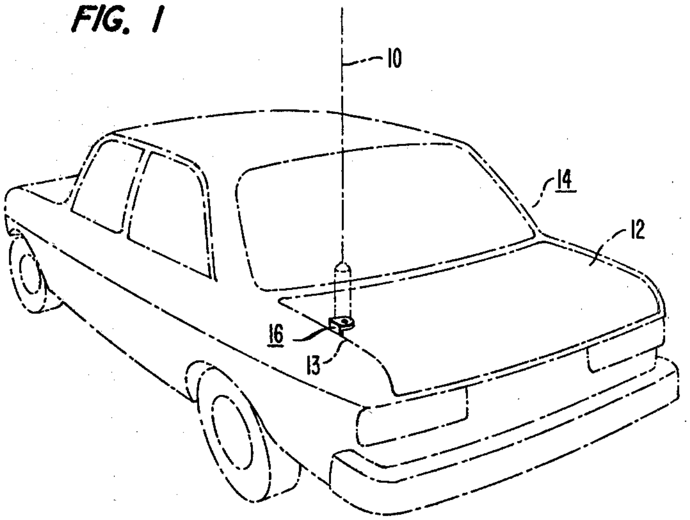
FIG. 1 is a pictorial of an automobile with a CB antenna mounted thereon by means of a mounting assembly secured to the trunk lid.
Figure 2:
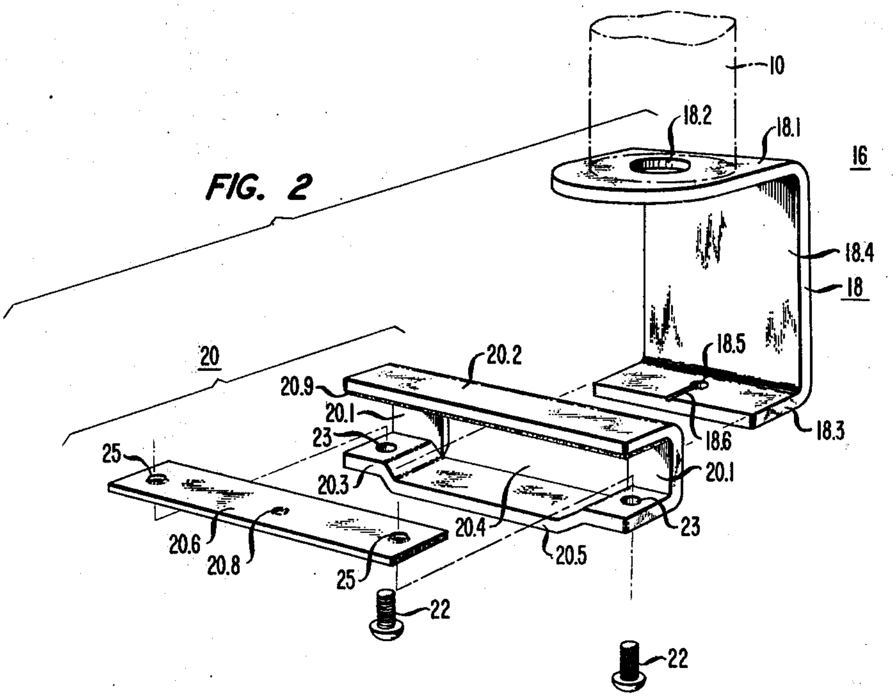
FIG. 2 is an exploded view of a mounting assembly in accordance with an illustrative embodiment of my invention.
Figure 3:
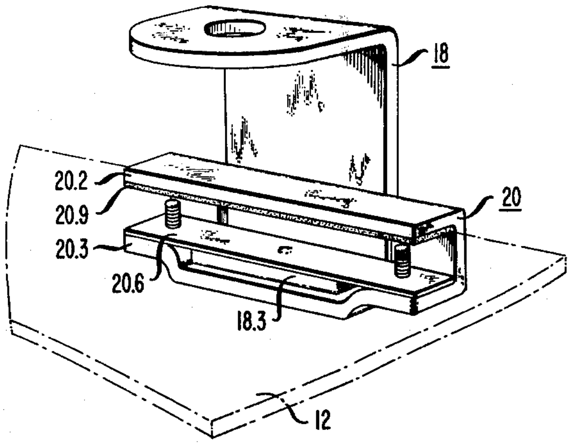
FIGS. 3 and 4 are isometric views of the assembly of FIG. 2 mounted on a trunk lid, as viewed from essentially opposite directions.

With reference now to FIG. 1, an object such as a CB antenna 10 is mounted on an edge of a rigid body such as the trunk lid 12 of an automobile 14 by means of an assembly 16. As shown in FIGS. 2–7, the mounting assembly 16 includes a stepped bracket 18 for carrying the antenna and a support member 20 mountable on the edge of the trunk lid 12 and adapted to releaseably engage the bracket 18. More specifically, bracket 18 comprises an upper planar tread 18.1 having a hole 18.2 or other suitable means by which the antenna 12 can be bolted or otherwise secured, a lower planar tread 18.3 which engages a U-shaped channel 20 and a planar riser 18.4 which joins together the two treads. The channel 20 in turn comprises a base 20.1 which joins together a pair of opposing sides 20.2 and 20.3. The base 20.1 has an aperture 20.4 therein which is dimensioned to receive riser 18.4 when the bracket 18 and support member 20 are engaged. The side 20.3, on the other hand, is depressed to form a plateau 20.5 and a plate 20.6 covers the plateau to form a slot 20.7 (FIG. 7) in registration with aperture 20.4 and into which the lower tread 18.3 fits snuggly; i.e., the width and height of the slot 20.7 are only slightly greater than the corresponding dimensions of the tread 18.3.

Although slot 20.7 and tread 18.2 are adapted to fit snuggly together to avoid rattling and the like, it may be advantageous to provide a snap fit between the two. This function is effected by a small dimple 20.8 on the inner surface (i.e., slot side) of plate 20.6 and a mating circular recess 18.5 on the upper surface of tread 18.3. An elongated recess 18.6 may also be provided between the leading edge of tread 18.3 and circular recess 18.5 in order to guide the dimple into circular recess. Of course, the dimple may be formed on tread 18.3 and the recess may be formed on plate 20.6, but this configuration would be somewhat more difficult to fabricate because bracket 18 is typically made of much thicker metal (e.g., steel) than plate 20.6, i.e., it is simpler to form dimple 20.8 by denting the relatively thin plate 20.6 and to form recess 18.5 by drilling a hole through tread 18.5.

Figure 4:
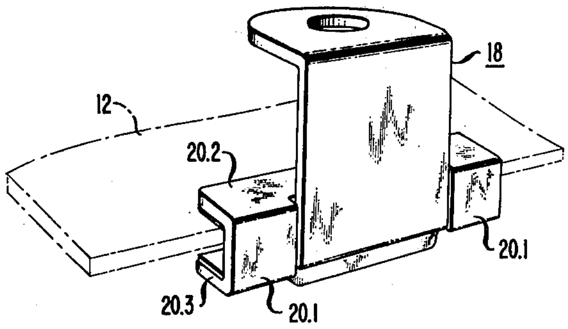
Figure 5:
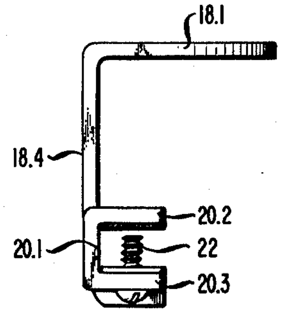
FIG. 5 is a side view of the assembly.
Figure 6:
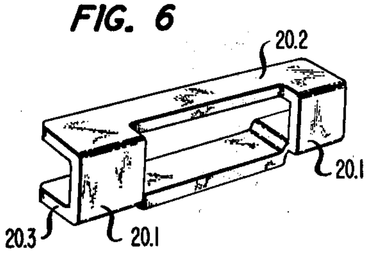
FIG. 6 is an isometric view of one embodiment of the U-shaped channel of the assembly.
Figure 7:
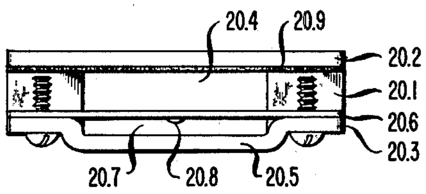
FIG. 7 is a front view of the U-shaped channel with the cover plate in place.

To further insure a tight fit between the bracket 18 and support member 20, the aperture 20.4 is made to be rectangular having a width only slightly greater than that of the riser 18.4 and a depth substantially equal to the thickness of riser 18.4. Consequently, when lower tread 18.3 is snapped into place on slot 20.7, riser 18.4 fits into aperture 20.4 flush with base 20.1 as seen in FIGS. 4 and 5. This feature also insures minimum interference with closing the trunk lid 12.

Another feature is the provision of a protective coating 20.9 of relatively soft material on the inner surface of the side 20.2 of channel 20. This coating prevents the outer surface of the trunk lid 12 from being scratched or marred during mounting, demounting or use of the assembly 16. Illustratively, coating 20.9 is a thin layer of cork-like material which is secured to side 20.2 by a suitable adhesive.

The support member 20 also includes means for being secured to the trunk lid 12. Besides dimensioning the width of channel between sides 20.2 and 20.3 to be somewhat greater than the thickness of the edge of lid 12, a pair of screws 22 are threaded through holes 23 in the end portions of the depressed side 20.3 so as to hold the lid tightly against the opposing side 20.2. These same screws are threaded through holes 25 in cover plate 20.6 (which are in registration with holes 23) to hold it against the end portions of depressed side 20.3.

Although the treads 18.1 and 18.3 are depicted as extending parallel to one another and from the same side of riser 18.4, they need not be strictly parallel and can extend from opposite sides of riser 18.4. In addition, the riser 18.4 can be formed from two pivotally connected segments (not shown) as depicted in FIG. 28 of my copending application Ser. No. 793,742, filed on May 4, 1977 in order to be able to orient the antenna vertically, or at some other desired angle.

In operation, the trunk lid 12 is opened and support member 18 is slid over an edge of the lid so that side 20.2 is above the lid (coating 20.9 contacting the top lid surface), side 20.3 is under the lid, and base 20.1 abuts the edge of the lid. Then, screws 22 are threaded inwardly to force the lid against the side 20.2, thus affixing the support member 18 to the lid 12. To mount the antenna (previously secured to tread 18.1) the lower tread is inserted into slot 20.7 until dimple 20.8 snaps into recess 18.5. Now the lid 12 can be closed and the antenna is ready for operation. Conversely, to store the antenna, the lid is opened, bracket 18 is pulled out of support member 20 and placed in the trunk space. Ordinarily, the support member 20 would remain affixed to the trunk lid.

While the foregoing description contains many specifications, these should not be construed as limitations upon the scope of the invention, but merely as an indication of several preferred embodiments thereof; the true scope of the invention is indicated by the subject of the appended claims and their legal equivalents.

What is claimed is:

1. An assembly (16) for mounting an antenna (10) on edge of an automobile body (12) comprising:

a stepped bracket (18) comprising an upper tread (18.1) for carrying the antenna, a lower tread (18.3) and a riser (18.4) joining said treads together;

a support member (20) which is mountable on said edge and which is adapted to releaseably engage said lower tread characterized in that said support member includes a pair of opposing sides (20.2, 20.3) and a base (20.1) joining said sides so as to form a U-shaped channel into which said edge is insertable;

one of said sides (20.3) is depressed to form a plateau (20.5);

a plate (20.6) covers said plateau so as to form a slot (20.7) into which said lower tread is insertable; and said base has an aperture (20.4) adapted to receive said riser when said lower tread is inserted into said slot.

2. The assembly of claim 1 wherein said aperture is in registration with said slot and is recessed into said base so that said riser fits into said aperture flush with said base.

3. The assembly of claim 2 wherein said aperture and said riser are generally rectangular in shape.

4. The assembly of claim 1 wherein said plateau and plate are mutually adapted so that said lower tread fits snuggly into said slot.

5. The assembly of claims 1, 2 or 4 wherein said plate has a dimple thereon and said lower tread has a recess therein which engages said dimple when said lower tread is inserted into said slot.

6. The assembly of claim 5 wherein said lower tread has a circular recess for engaging said dimple and an elongated recess extending from an edge of said lower tread to said circular recess which serves to guide said dimple into said circular recess.

7. The assembly of claim 1 including a protective coating affixed to the inner surface of said other side of said support member.

8. The assembly of claim 1 wherein end portions have a hole extending therethrough and including screws threaded in each said hole so as to force said edge of said body against said other side of said support member.

9. The assembly of claim 8 wherein said plate has holes in registration with said holes in said end portions so that said screws hold said plate against said end portions.

10. An assembly for mounting a CB antenna or the like on the edge of an automobile trunk lid comprising:

a stepped bracket comprising an upper planar tread for carrying said antenna, a lower planar tread and a rectangular planar riser joining said treads together;

a support member which is mountable on said edge and which is adapted to releaseably engage said lower tread characterized in that:

said support member includes a pair of parallel opposing sides and a base joining said sides so as to form a U-shaped channel into which said edge is insertable;

one of said sides is depressed to form a plateau and a pair of end portions adjacent said plateau;

a plate covers said plateau and is secured to said end portions so as to form a slot into which said lower tread is insertable, said plateau and said plate being mutually adapted so that said lower tread fits snuggly into said slot;

said base has a rectangular aperture which is in registration with said slot and is adapted to receive said riser when said lower tread is inserted into said slot, and which is recessed into said base so that said riser fits into said aperture flush with said base;

said plate has a dimple thereon, and said lower tread has a circular recess therein and an elongated recess extending from an edge of said lower tread to said circular recess so that when said lower tread is inserted into said slot, said elongated recess guides said dimple into said circular recess and snaps into place;

a protective coating is affixed to the inner surface of said other side of said support member so as to prevent the outer surface of said trunk lid from being marred by said support member; and fastener means is secured to said end portions of said one side of said support member so as to hold said edge of said trunk lid in said channel and against said coating and to hold said plate against said end portions.

* * * * *